(12) United States Patent
Raymo, Sr.

(10) Patent No.: US 8,499,788 B2
(45) Date of Patent: Aug. 6, 2013

(54) DRY AIR FUEL VENT BREATHER

(76) Inventor: Richard J. Raymo, Sr., Lorton, VA (US)

( * ) Notice: Subject to any disclaimer, the term of this patent is extended or adjusted under 35 U.S.C. 154(b) by 1098 days.

(21) Appl. No.: 12/476,817

(22) Filed: Jun. 2, 2009

(65) Prior Publication Data

US 2009/0293848 A1 Dec. 3, 2009

Related U.S. Application Data

(60) Provisional application No. 61/058,338, filed on Jun. 3, 2008.

(51) Int. Cl.
*B60K 15/04* (2006.01)
*B65D 90/06* (2006.01)

(52) U.S. Cl.
USPC ....... 137/587; 220/567.2; 220/4.14; 123/519; 137/588; 137/589

(58) Field of Classification Search
CPC .... B60K 15/04; B60K 15/03504; B60K 15/06; B60K 15/03519; B60K 15/0406; B60K 2015/03547; B60K 2015/03552; B67D 1/1466; B65D 88/54; D21F 1/66; E03B 11/06; E03B 11/08; A61L 2/26; B63J 2/02; B63J 2/00; B63B 11/04; F02M 37/02; F02M 25/0854
USPC .............. 137/587, 588, 589, 590, 590.5, 591, 137/592; 220/567.2, 560.03, 4.14, 4.15; 123/519, 520, 521

See application file for complete search history.

(56) References Cited

U.S. PATENT DOCUMENTS

| | | | | |
|---|---|---|---|---|
| 1,841,691 A | * | 1/1932 | Wilson | 220/371 |
| 2,428,426 A | * | 10/1947 | Lindsay | 312/31.1 |
| 2,603,308 A | * | 7/1952 | McCall | 96/138 |
| 3,061,138 A | * | 10/1962 | Edelmann et al. | 220/203.15 |
| 4,024,848 A | | 5/1977 | Lee | |
| 4,028,075 A | * | 6/1977 | Roberge | 96/139 |
| 4,068,625 A | | 1/1978 | Brown | |
| 4,084,531 A | | 4/1978 | Fujira et al. | |
| 4,150,639 A | | 4/1979 | Buszek | |
| 4,162,021 A | * | 7/1979 | Crute | 220/202 |
| 4,300,482 A | | 11/1981 | Tinkham | |
| 4,334,989 A | * | 6/1982 | Hall | 210/114 |
| 4,504,289 A | * | 3/1985 | Waller | 96/138 |
| 4,572,394 A | * | 2/1986 | Tanahashi et al. | 220/86.2 |
| 4,589,852 A | | 5/1986 | Price | |
| 4,677,929 A | * | 7/1987 | Harris | 114/211 |
| 4,795,556 A | * | 1/1989 | Brotea et al. | 210/94 |
| 4,829,968 A | | 5/1989 | Onufer | |
| 4,860,713 A | * | 8/1989 | Hodgkins | 123/510 |

(Continued)

OTHER PUBLICATIONS

Cutler, "Boat owners grapple with new blended fuel Ethanol additive posing a problem for some vessels," The Boston Globe, Jul. 15, 2006 (2 pages).

*Primary Examiner* — Stephen K Cronin
*Assistant Examiner* — Raza Najmuddin
(74) *Attorney, Agent, or Firm* — Rothwell, Figg, Ernst & Manbeck, P.C.

(57) ABSTRACT

A dry air fuel vent breather to remove the moisture from air entering a fuel system is provided. When air flows in to the breather from the outside, it is forced through a desiccant cartridge. When air is exhausted from the system, it bypasses the desiccant cartridge.

20 Claims, 2 Drawing Sheets

U.S. PATENT DOCUMENTS

| | | | | |
|---|---|---|---|---|
| 4,877,152 | A | 10/1989 | Whitley, II | |
| 5,088,947 | A | 2/1992 | Whitley, II et al. | |
| 5,133,185 | A | 7/1992 | Gilbreath et al. | |
| 5,386,843 | A | 2/1995 | Church | |
| 5,575,832 | A * | 11/1996 | Boyd | 95/91 |
| 5,728,913 | A | 3/1998 | Finkl | |
| 5,916,442 | A | 6/1999 | Goodrich | |
| 5,957,072 | A | 9/1999 | Hattori | |
| 5,993,675 | A * | 11/1999 | Hagerthy | 210/799 |
| 6,155,239 | A | 12/2000 | Dykstra | |
| 6,227,184 | B1 | 5/2001 | Katayama et al. | |
| 6,501,025 | B2 | 12/2002 | Tilli et al. | |
| 6,511,052 | B1 | 1/2003 | Tonkin et al. | |
| 6,532,888 | B1 * | 3/2003 | Enik | 114/343 |
| 6,582,263 | B1 | 6/2003 | Jaeger et al. | |
| 6,645,021 | B1 | 11/2003 | Kawai et al. | |
| 6,827,067 | B1 | 12/2004 | Yang et al. | |
| 6,875,249 | B2 | 4/2005 | Gogins | |
| 6,920,868 | B2 | 7/2005 | Ruggiero et al. | |
| 7,201,155 | B2 * | 4/2007 | Mills | 123/520 |
| 7,267,112 | B2 * | 9/2007 | Donahue et al. | 123/518 |
| 7,285,150 | B2 * | 10/2007 | Golner et al. | 55/417 |
| 7,353,808 | B2 * | 4/2008 | Kakoo | 123/516 |
| 7,677,277 | B2 * | 3/2010 | Thompson et al. | 141/350 |
| 7,913,722 | B2 * | 3/2011 | Dorst | 141/86 |
| 8,096,438 | B2 * | 1/2012 | Schmalz et al. | 220/371 |
| 2006/0011257 | A1 * | 1/2006 | Devall | 141/59 |
| 2008/0276853 | A1 * | 11/2008 | Dorst | 114/173 |
| 2012/0097675 | A1 * | 4/2012 | Sotiriades et al. | 220/202 |

* cited by examiner

DRY AIR FUEL VENT BREATHER

CROSS REFERENCE TO RELATED APPLICATION

This application claims the benefit of Provisional Patent Application Ser. No. 61/058,338, filed Jun. 3, 2008, which is incorporated herein by reference in its entirety.

BACKGROUND OF THE INVENTION

1. Field of the Invention

The present invention relates generally to systems and methods for preventing moisture from accumulating in a fuel tank.

2. Description of the Related Art

Water-contaminated fuel can cause severe fuel system and engine damage. Water in fuel systems can also cause fuel holding tanks to rust and leak. Leaking fuel tanks can cause myriad problems including explosions. Additionally, engines using water-contaminated fuels can rust, stall or wear exceptionally quickly. Such problems can be costly and time consuming to remedy. Accordingly, it is important to prevent moisture from building up in the fuel tanks of vessels used in water borne vessels and other recreational vessels.

Fuel can become contaminated by water in a number of ways. For example, water vapor or moisture can enter a fuel tank through a fuel tank vent and condense. Such a problem is very common on water borne vessels like commercial and recreational power boats. To deal with problems of water contamination, boat and other fuel systems have been equipped with integral water removal components. For example, water-fuel separators can be added to a fuel line and/or mounted onto an engine. However, fuel separators do not prevent water from accumulating in a fuel tank.

Other systems employ manufacturer-installed moisture removal components into a vessel fuel tank system. However, integrated systems are difficult and expensive to add to an existing fuel system.

Thus, there exists a need in the prior art for systems that prevent the contamination of fuel by removing the moisture from the air as it enters the fuel tank that is simple and inexpensive to install and maintain.

SUMMARY OF THE INVENTION

The present invention provides a system and method for eliminating moisture contamination in a fuel tank.

According to one embodiment of the present invention, a dry air fuel vent breather is provided for use in a vessel with a vented fuel system that includes a fuel vent to equalize air pressure between the fuel system and the outside environment. The dry air fuel vent breather system may comprise a housing with a main portion and a flange portion, wherein the flange portion may be configured to allow the housing to be externally coupled to or mounted over a fuel vent and form a substantially air tight seal therewith. The system may include a desiccant cartridge disposed within the housing. First and second valves can be provided to direct the air flow into and from the system (i.e., allow the system to breathe) without any restriction to the natural breathing of the influent/effluent vapors.

According to an embodiment of the invention, the first valve can be disposed within the housing and arranged such that low air pressure in the fuel system relative to the outside air pressure causes air to be drawn into the housing from the outside via the first valve through the desiccant cartridge while the second valve allows air to escape from the housing without passing through the water removal means, and such that high pressure in the fuel system relative to the outside air pressure causes air to be expelled via the second valve.

According to another embodiment of the present invention, the dry air fuel vent breather can include a desiccant cartridge that is removable and replaceable. According to another embodiment of the present invention, the dry air fuel vent breather is removably installed on the surface of a vessel and is easily removable and replaceable.

According to embodiments of the present invention, the desiccant cartridge includes a material that is configured to change color when it becomes saturated with moisture and has reduced activity as a desiccant. A window can be provided in the housing that allows for quick and easy inspection of the desiccant material to determine whether its color has changed.

According to an embodiment of the present invention, a dry air fuel vent breather is provided for use in a vessel with a vented fuel system that includes a fuel vent to equalize air pressure between the fuel system and the outside environment. The dry air fuel vent breather may comprise a housing with a main portion and a flange portion. The flange portion can be configured to allow the housing to be coupled to vessel's fuel vent and forms a substantially air tight seal therewith. The dry air fuel vent breather may further comprise a means for removing moisture from the air entering the fuel vent, such as a desiccant cartridge. Preferably, the means for removing moisture can be disposed within the housing. According to an embodiment of the present invention, the desiccant cartridge can further comprise a fine screen mesh that encloses a desiccant, which can be silica gel. Furthermore, the desiccant cartridge can be configured so that it changes color when it becomes saturated with moisture.

The dry air fuel vent breather may further comprise a first valve disposed within the housing and arranged such that low air pressure in the fuel system relative to the outside air pressure causes air to be drawn into the housing from the outside environment via the first valve. A second valve can also be provided to let air escape from the housing. The second valve can be configured such that high pressure in the fuel system relative to the outside environment causes air to be expelled via the second valve. According to an embodiment of the present invention, when air is drawn in to the housing via the first valve it is forced to flow through the desiccant cartridge and when air is exhausted from the housing via the second valve, it bypasses the desiccant cartridge According to an embodiment of the present invention, the housing can be secured to the vessel's surface with a self-adhesive backing. The housing may be removably attached to the vessel surface or permanently attached to the vessel surface. Additionally, according to an embodiment of the present invention, the desiccant cartridge can be removable and replaceable. According to an embodiment of the present invention, the entire dry air fuel vent breather is removable and replaceable.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

The term vessel is used throughout this document to illustrate the present invention; however, the present invention could be applied to other motor vehicles or to any motorized system with a vented fuel system that operates.

In many fuel systems, it is advantageous to avoid fluctuations in pressure. However, during normal operations of an un-vented fuel system, the pressure in the system can, decrease as fuel is consumed or increase when the air in the fuel tank expands. Many fuel systems include a vent through which air can flow to equalize the pressure of the fuel system with the outside environment. One of ordinary skill in the art would understand air to mean a variety of different things including atmospheric air, vapors, and other gasses.

Figure 1:
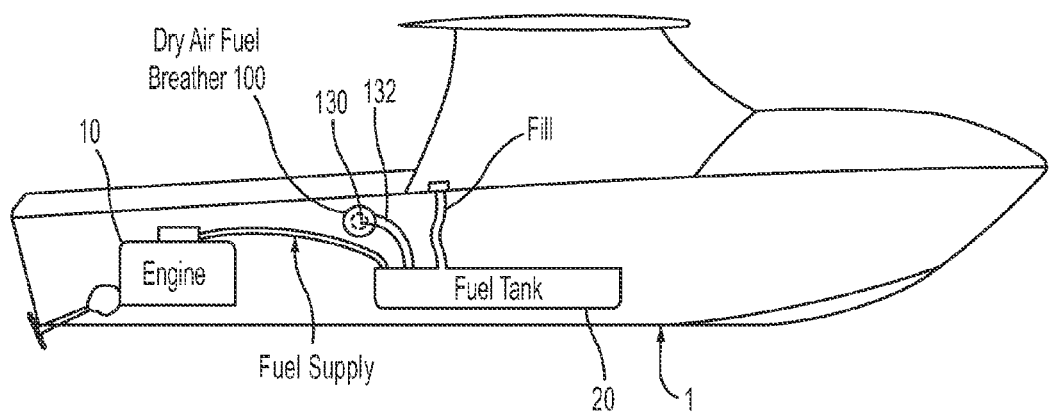
FIG. 1 illustrates a dry air fuel vent breather installed onto a recreational boat according to an embodiment of the present invention.

As shown in FIG. 1, in a vented fuel system arrangement in a boat 1, a vent 130 is connected to the fuel system 20 through a hose 132. The fuel system is typically connected to propulsion system 10. According to one embodiment of the present invention, a dry air fuel breather 100 can be installed to an existing vented fuel system by mounting the dry air fuel breather 100 over the fuel vent 130 on the outside of the hull of boat 1. Preferably, dry air fuel breather 100 is removably mounted over the vent 130 and attached the outer surface of the boat 1 hull 120. It would be understood by one of ordinary skill in the art, that it would also be possible to permanently mount the dry air fuel breather 100 over the air vent as well.

Figure 2:
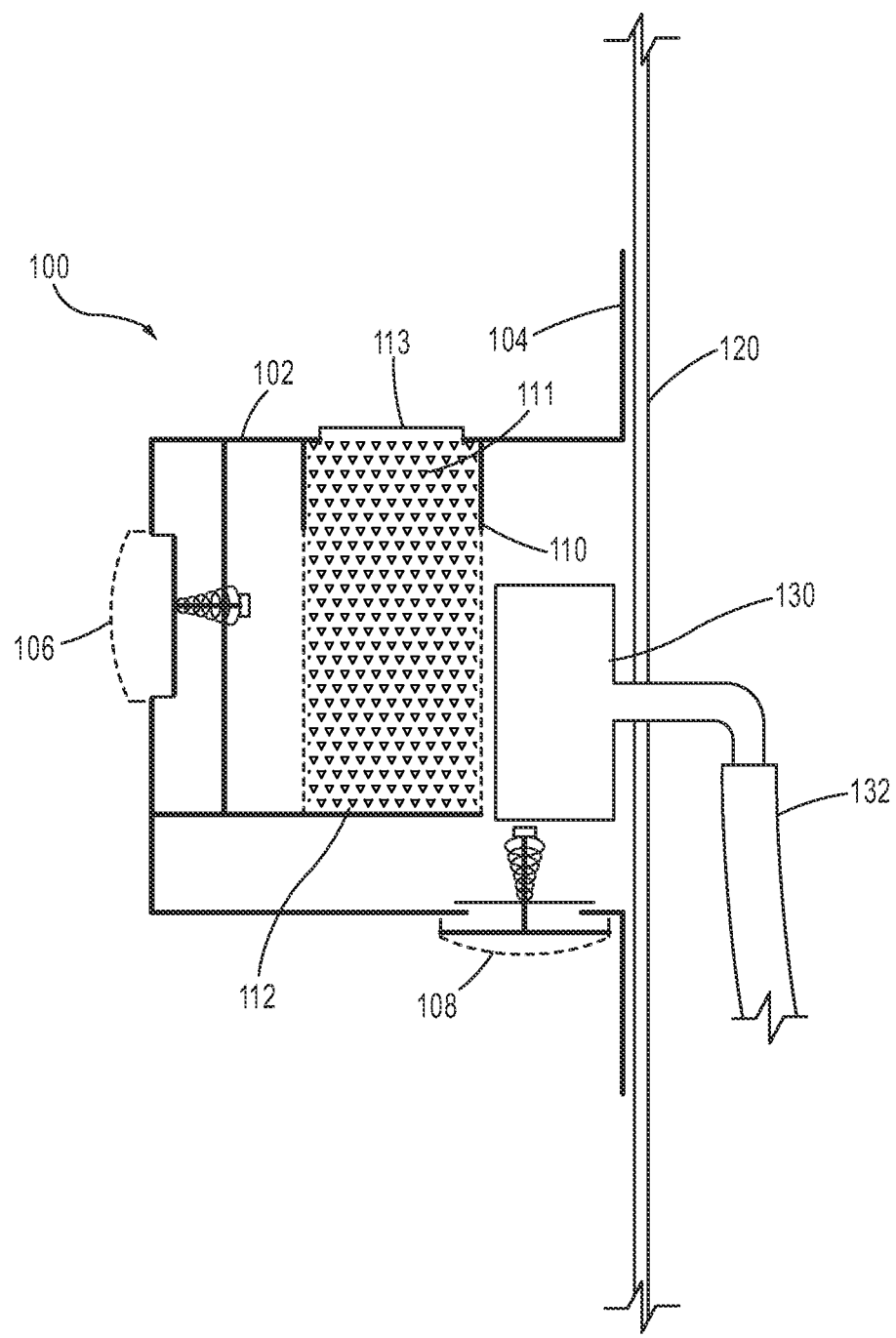
FIG. 2 is a schematic drawing of a dry air fuel vent breather according to an embodiment of the present invention.

Referring now to FIG. 2, dry air fuel vent breather 100 may comprise a housing 102 for housing air regulation means and means for removing moisture from air. The housing 102 may include a flange portion 104. According to an embodiment of the present invention, the dry air fuel vent breather 100 is mounted to the vessel surface 120 by applying an adhesive between the flange portion 104 of the housing 102 and the vessel surface 120 to form an air-tight seal. Alternatively, the dry air fuel vent breather may be mounted to the vessel surface with bolts, clamps, suction, magnets, or any other suitable means. Furthermore, gaskets may be placed between flange portion 104 and vessel surface 120 to facilitate an air-tight seal. An additional mounting method may be to attach a mounting bracket directly to the vessel's surface by any of the previously noted means and clip or snap the body of the dry air vent breather in and out of this bracket. According to some embodiments of the present invention, the mounting bracket may stay attached to the vessel's hull and the dry air vent breather may be inserted or removed from the bracket at any time.

Dry air fuel vent breather 100 may further comprise means for regulating air flow to and from the fuel vent line. For instance, an intake check valve 106 and an exhaust check valve 108 can be provided. Intake check valve 106 can be configured such that when there is negative pressure on the inside of the housing 102 with respect to the outside environment, by a pre-selected degree, intake check valve 106 opens and allows air to enter the housing. Conversely, when the negative pressure inside the housing is not greater than a certain amount or when the pressure is positive, intake check valve 106 is closed and does not allow air to pass. Exhaust check valve 108 can be configured to allow air to exhaust from the dry air fuel vent breather when the positive pressure inside of the housing with respect to the outside air pressure is greater than a certain amount. When the positive pressure inside the housing is not greater than a certain amount, then the exhaust check valve 108 remains closed and does not allow air to pass.

When negative air pressure inside the housing 102 reaches a certain level, intake check valve 106 opens and air is taken into the system. The air can be directed first through a moisture removal means, which may include a removable desiccant cartridge 110, before entering the fuel system via the fuel tank vent 130. According to an embodiment of the present invention, desiccant cartridge 110 comprises a fine screen mesh 111, which is filled with an appropriate desiccant 112 such as silica gel. As air is directed through the desiccant cartridge 110, moisture is removed therefrom.

When positive air pressure inside of the housing 102 reaches a certain level, exhaust check valve 108 opens and allows air to exhaust from the system. According to an embodiment of the present invention, the exhausted air bypasses the desiccant cartridge 110 entirely. Of course, hoses or channels could further be employed to direct the flow of air to and from the fuel vent.

According to an embodiment of the present invention, the desiccant cartridge 110 is configured to change color when it becomes saturated with moisture, thus indicating when it is time to change the cartridge. A window 113 can be provided to allow for quick and easy inspection of the desiccant cartridge 110 to determine whether it needs to be changed. When it has been determined that the desiccant cartridge needs to be changed, the desiccant cartridge 110 can be removed and replaced with a new cartridge 110. Alternatively, according to other embodiments of the invention, the entire dry air fuel vent breather 100 could be removed and replaced with a new one when the desiccant cartridge becomes saturated with moisture.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

I claim:

1. A modular dry air fuel breather provided for use on a vessel vented fuel system that includes a fuel vent to equalize air pressure between the fuel system and the outside environment, wherein said fuel vent is positioned on an exterior side of the vessel and connected to the fuel system, said fuel breather comprising:
    a housing having a main portion and a flange portion, said flange portion being configured to allow the housing to be placed over said fuel vent to form a substantially air tight seal with the exterior side of the vessel;
    a water removing device disposed within the housing;
    a first valve that allows air to flow of breathe from outside the housing, through the water removing device, to said fuel vent; and
    a second valve that allows air to flow or breathe from the fuel vent to outside The housing without flowing through said water removing device.

2. The dry air fuel breather as recited by claim 1, wherein said first valve is configured such that low air pressure in the fuel system relative to the outside air pressure causes air to be drawn into the housing from the outside via said first value and through said water removing device.

3. The dry air fuel breather as recited by claim 1, wherein said second valve is configured to allow air to escape from said housing without passing through said water removing device when the pressure inside the fuel system is higher than the outside air pressure.

4. The dry air fuel breather as recited by claim 1, wherein said water removing device is a desiccant cartridge.

5. The dry air fuel breather as recited by claim 4, wherein said desiccant cartridge includes a material that is configured to change color when it becomes saturated with moisture and has reduced activity as a desiccant.

6. The dry air fuel breather as recited by claim 5, wherein said housing further comprises a window allowing for inspection of the desiccant material to determine whether its color has changed.

7. The dry air fuel breather as recited by claim 1, wherein said water removing device is removable and replaceable.

8. The dry air fuel breather as recited by claim 1, wherein said housing is configured to be removably installed on the surface of the vessel and is easily removable and replaceable.

9. The dry air fuel breather as recited by claim 1, further comprising a mounting bracket configured to attach to a hull of the vessel and to attach to said housing.

10. The dry air fuel breather as recited by claim 9, wherein said housing can attach and detach from said mounting bracket at any time.

11. A modular dry air fuel breather provided for use on a vessel vented fuel system that includes a fuel vent to equalize air pressure between the fuel system and the outside environment, wherein said fuel vent is positioned on an exterior side of the vessel and connected to the fuel system, said fuel vent breather comprising:
   a housing having a main portion and a flange portion, said flange portion being configured to allow the housing to be placed over said fuel vent to form a substantially air tight seal with the exterior side of the vessel;
   a means for removing water from air disposed within the housing;
   a first means for allowing air to flow or breathe from outside the housing, through the means for removing water, to said fuel vent; and
   a second means for allowing air to flow or breathe from the fuel vent to outside the housing without flowing through said means for removing water.

12. The dry air fuel breather as recited by claim 11, wherein said first means is configured such that low air pressure in the fuel system relative to the outside air pressure causes air to be drawn into the housing from the outside via said first value and through said water removing device.

13. The dry air fuel breather as recited by claim 11, wherein said second means is configured to allow air to escape from said housing without passing through said means for removing water from air when the pressure inside the fuel system is higher than the outside air pressure.

14. The dry air fuel breather as recited by claim 11, wherein said means for removing water from air comprises a desiccant cartridge.

15. The dry air fuel breather as recited by claim 14, wherein said means for removing water from air includes a color changing means that changes color when it becomes saturated with moisture and has reduced activity as a desiccant.

16. The dry air fuel breather as recited by claim 15, wherein said housing further comprises a means for allowing inspection of the desiccant material to determine whether its color has changed.

17. The dry air fuel breather as recited by claim 11, wherein said means for removing water from air is removable and replaceable.

18. The dry air fuel breather as recited by claim 11, wherein said housing is configured to be removably installed on the surface of the vessel and is easily removable and replaceable.

19. The dry air fuel breather as recited by claim 11, further comprising a mounting means configured to attach to a hull of the vessel and to attach to said housing.

20. The dry air fuel breather as recited by claim 19, wherein said housing can attach and detach from said mounting means at any time.

\* \* \* \* \*